(12) United States Patent
Needham

(10) Patent No.: US 7,639,368 B2
(45) Date of Patent: Dec. 29, 2009

(54) TRACKING ALGORITHM FOR LINEAR ARRAY SIGNAL PROCESSOR FOR FABRY-PEROT CROSS-CORRELATION PATTERN AND METHOD OF USING SAME

(75) Inventor: David B. Needham, Magnolia, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 126 days.

(21) Appl. No.: 11/519,037

(22) Filed: Sep. 11, 2006

(65) Prior Publication Data

US 2007/0064241 A1   Mar. 22, 2007

Related U.S. Application Data

(60) Provisional application No. 60/716,483, filed on Sep. 13, 2005.

(51) Int. Cl.
*G01B 11/02* (2006.01)
(52) U.S. Cl. .................................................. 356/505
(58) Field of Classification Search ................ 356/505, 356/506
See application file for complete search history.

(56) References Cited

U.S. PATENT DOCUMENTS

| | | | |
|---|---|---|---|
| 1,432,149 A | 10/1922 | Bellingham | |
| 3,923,400 A | 12/1975 | Hardy | |
| 4,210,029 A | 7/1980 | Porter | |
| 4,329,058 A | 5/1982 | James et al. | |
| 4,393,714 A | 7/1983 | Schmidt | |
| 4,418,981 A | 12/1983 | Stowe | |
| 4,428,239 A | 1/1984 | Johnston | |
| 4,572,669 A | 2/1986 | James et al. | |
| 4,583,228 A | 4/1986 | Brown et al. | |
| 4,596,466 A | 6/1986 | Ulrich | |
| 4,606,638 A | 8/1986 | Sommargren | |
| 4,628,211 A | 12/1986 | Ruppert | |
| 4,640,616 A | 2/1987 | Michalik | |
| 4,647,203 A | 3/1987 | Jones et al. | |
| 4,648,083 A | 3/1987 | Giallorenzi | |
| 4,668,889 A | 5/1987 | Adams | |

(Continued)

FOREIGN PATENT DOCUMENTS

DE    3127333    1/1983

(Continued)

OTHER PUBLICATIONS

Int'l Search Report, Nov. 19, 2007, Davidson Instruments.

(Continued)

*Primary Examiner*—Tarifur Chowdhury
*Assistant Examiner*—Jonathon D Cook
(74) *Attorney, Agent, or Firm*—Booth Albanesi Schroeder LLC

(57) ABSTRACT

An algorithm and method for calculating an interferometric gap is disclosed that comprises providing an interferometric sensor having a first gap and an interferometric correlation element having a second gap placed in series with the first gap. A correlation burst waveform is generated having a plurality of features wherein the shape of the burst waveform evolves across the range of the second gap. Means are provided for tracking the features across the entire range of gaps and determining the dominant peak or dominant valley to determine the first gap.

24 Claims, 5 Drawing Sheets

U.S. PATENT DOCUMENTS

| | | |
|---|---|---|
| 4,678,909 A | 7/1987 | Jackson et al. |
| 4,729,654 A | 3/1988 | Akuta et al. |
| 4,755,668 A | 7/1988 | Davis |
| 4,777,358 A | 10/1988 | Nelson |
| 4,787,741 A | 11/1988 | Udd et al. |
| 4,806,016 A | 2/1989 | Corpron et al. |
| 4,844,616 A | 7/1989 | Kulkarni et al. |
| 4,873,989 A | 10/1989 | Einzig |
| 4,907,035 A | 3/1990 | Galburt et al. |
| 4,914,666 A | 4/1990 | Glance |
| 4,932,781 A | 6/1990 | Kuwayama |
| 4,968,144 A | 11/1990 | Thomas et al. |
| 4,972,077 A | 11/1990 | Willson et al. |
| 4,995,697 A | 2/1991 | Adamovsky |
| 5,034,603 A | 7/1991 | Wilson |
| 5,089,696 A | 2/1992 | Turpin |
| 5,094,534 A | 3/1992 | Cole et al. |
| 5,128,537 A | 7/1992 | Halg |
| 5,128,798 A | 7/1992 | Bowen et al. |
| 5,148,604 A | 9/1992 | Bantien |
| 5,177,805 A | 1/1993 | Groger et al. |
| 5,187,546 A | 2/1993 | Johnston |
| 5,202,939 A * | 4/1993 | Belleville et al. ............. 385/12 |
| 5,218,418 A | 6/1993 | Layton |
| 5,218,426 A | 6/1993 | Hall et al. |
| 5,225,888 A | 7/1993 | Selwyn et al. |
| 5,239,400 A | 8/1993 | Liu |
| 5,247,597 A | 9/1993 | Blacha et al. |
| 5,276,501 A | 1/1994 | McClintock et al. |
| 5,283,625 A | 2/1994 | Bunn, Jr. |
| 5,319,981 A | 6/1994 | Mei et al. |
| 5,351,317 A | 9/1994 | Weber |
| 5,361,130 A | 11/1994 | Kersey et al. |
| 5,386,729 A | 2/1995 | Reed et al. |
| 5,392,117 A | 2/1995 | Belleville et al. |
| 5,400,140 A | 3/1995 | Johnston |
| 5,401,956 A | 3/1995 | Dunphy et al. |
| 5,401,958 A | 3/1995 | Berkcan |
| 5,420,688 A | 5/1995 | Farah |
| 5,444,724 A | 8/1995 | Goto |
| 5,451,772 A | 9/1995 | Narendran |
| 5,471,428 A | 11/1995 | Baroni et al. |
| 5,477,323 A | 12/1995 | Andrews et al. |
| 5,497,233 A | 3/1996 | Meyer |
| 5,509,023 A | 4/1996 | Glance et al. |
| 5,526,114 A | 6/1996 | Eselun |
| 5,550,373 A | 8/1996 | Cole et al. |
| 5,557,406 A | 9/1996 | Taylor et al. |
| 5,559,358 A | 9/1996 | Burns et al. |
| 5,631,736 A | 5/1997 | Thiel et al. |
| 5,641,956 A | 6/1997 | Vengsarkar et al. |
| 5,646,762 A | 7/1997 | Delavaux et al. |
| 5,647,030 A | 7/1997 | Jorgenson et al. |
| 5,657,405 A | 8/1997 | Fujiwara |
| 5,682,237 A | 10/1997 | Belk |
| 5,760,391 A | 6/1998 | Narendran |
| 5,784,507 A | 7/1998 | Holm-Kennedy et al. |
| 5,796,007 A | 8/1998 | Panagotopulos et al. |
| 5,818,586 A | 10/1998 | Lehto et al. |
| 5,835,214 A | 11/1998 | Cabib et al. |
| 5,835,645 A | 11/1998 | Jorgenson et al. |
| 5,847,828 A | 12/1998 | Downs |
| 5,852,498 A | 12/1998 | Youvan et al. |
| 5,872,628 A | 2/1999 | Erskine |
| 5,889,590 A | 3/1999 | Duggal et al. |
| 5,891,747 A | 4/1999 | Farah |
| 5,910,840 A | 6/1999 | Furstenau |
| 5,923,030 A | 7/1999 | Assard et al. |
| 5,926,591 A | 7/1999 | Labeye et al. |
| 5,929,990 A | 7/1999 | Hall |
| 5,949,801 A | 9/1999 | Tayebati |
| 5,986,749 A | 11/1999 | Wu et al. |
| 5,999,261 A | 12/1999 | Pressesky et al. |
| 5,999,262 A | 12/1999 | Dobschal et al. |
| 6,016,702 A | 1/2000 | Maron |
| 6,020,963 A | 2/2000 | DiMarzio |
| 6,057,911 A | 5/2000 | Reich |
| 6,064,630 A | 5/2000 | Fersht et al. |
| 6,069,686 A | 5/2000 | Wang et al. |
| 6,075,613 A | 6/2000 | Schermer et al. |
| 6,078,706 A | 6/2000 | Nau et al. |
| 6,088,144 A | 7/2000 | Doerr |
| 6,115,521 A | 9/2000 | Tran et al. |
| 6,118,534 A | 9/2000 | Miller |
| 6,122,415 A | 9/2000 | Blake |
| 6,137,621 A | 10/2000 | Wu |
| 6,151,114 A | 11/2000 | Russell |
| 6,157,025 A | 12/2000 | Katagiri et al. |
| 6,173,091 B1 | 1/2001 | Reich |
| 6,178,001 B1 | 1/2001 | Kim |
| 6,233,262 B1 | 5/2001 | Mesh et al. |
| 6,281,976 B1 | 8/2001 | Taylor et al. |
| 6,282,215 B1 | 8/2001 | Zorabedian et al. |
| 6,289,143 B1 | 9/2001 | Berthold et al. |
| 6,304,686 B1 | 10/2001 | Yamate et al. |
| 6,328,647 B1 | 12/2001 | Traudt |
| 6,330,255 B1 | 12/2001 | Hung |
| 6,331,892 B1 | 12/2001 | Green |
| 6,396,605 B1 | 5/2002 | Heflinger et al. |
| 6,422,084 B1 | 7/2002 | Fernald et al. |
| 6,425,290 B2 | 7/2002 | Willcox et al. |
| 6,439,055 B1 | 8/2002 | Maron et al. |
| 6,469,817 B1 | 10/2002 | Heflinger |
| 6,486,984 B1 | 11/2002 | Baney et al. |
| 6,490,038 B1 | 12/2002 | Jung et al. |
| 6,492,636 B1 | 12/2002 | Chen et al. |
| 6,492,800 B1 | 12/2002 | Woods et al. |
| 6,496,265 B1 | 12/2002 | Duncan et al. |
| 6,501,551 B1 | 12/2002 | Tearney et al. |
| 6,522,797 B1 | 2/2003 | Siems et al. |
| 6,538,748 B1 | 3/2003 | Tucker et al. |
| 6,539,136 B1 | 3/2003 | Dianov et al. |
| 6,545,760 B1 | 4/2003 | Froggatt et al. |
| 6,552,799 B1 | 4/2003 | Wright et al. |
| 6,563,968 B2 | 5/2003 | Davis et al. |
| 6,583,882 B2 | 6/2003 | Scruggs et al. |
| 6,594,022 B1 | 7/2003 | Watterson et al. |
| 6,597,458 B2 | 7/2003 | Tayag et al. |
| 6,603,560 B1 | 8/2003 | Islam |
| 6,608,685 B2 | 8/2003 | Wood et al. |
| 6,612,174 B2 | 9/2003 | Sittler et al. |
| 6,621,258 B2 | 9/2003 | Davidson et al. |
| 6,633,593 B2 | 10/2003 | Ksendzov et al. |
| 6,636,321 B2 | 10/2003 | Bohnert |
| 6,643,025 B2 | 11/2003 | Degertekin et al. |
| 6,647,160 B1 | 11/2003 | Chi et al. |
| 6,650,420 B2 | 11/2003 | Houston et al. |
| 6,668,105 B2 | 12/2003 | Chen et al. |
| 6,668,111 B2 | 12/2003 | Tapalian et al. |
| 6,668,656 B2 | 12/2003 | Fernald et al. |
| 6,687,011 B1 | 2/2004 | Lee et al. |
| 6,687,036 B2 | 2/2004 | Riza |
| 6,690,873 B2 | 2/2004 | Bendett et al. |
| 6,714,566 B1 | 3/2004 | Coldren et al. |
| 6,714,700 B2 | 3/2004 | Burger et al. |
| 6,717,965 B2 | 4/2004 | Hopkins, II et al. |
| 6,735,224 B2 | 5/2004 | Murry et al. |
| 6,741,357 B2 | 5/2004 | Wang et al. |
| 6,747,743 B2 | 6/2004 | Skinner et al. |
| 6,765,194 B2 | 7/2004 | Holz et al. |
| 6,771,905 B1 | 8/2004 | Bortz |
| 6,776,049 B2 | 8/2004 | Johnson et al. |
| 6,785,004 B2 | 8/2004 | Kersey et al. |
| 6,791,694 B2 | 9/2004 | Pezeshki |

| | | |
|---|---|---|
| 6,798,940 B2 | 9/2004 | Lee et al. |
| 6,806,961 B2 | 10/2004 | Hill |
| 6,820,489 B2 | 11/2004 | Fernald et al. |
| 6,822,979 B2 | 11/2004 | Daiber |
| 6,825,934 B2 | 11/2004 | Baney et al. |
| 6,829,073 B1 | 12/2004 | Krol et al. |
| 6,838,660 B2 | 1/2005 | Duncan et al. |
| 6,839,131 B2 | 1/2005 | Kwon |
| 6,842,254 B2 | 1/2005 | Van Neste et al. |
| 6,879,421 B2 | 4/2005 | Clark et al. |
| 6,882,428 B2 | 4/2005 | Baney et al. |
| 6,886,365 B2 | 5/2005 | Rumpf et al. |
| 6,886,404 B2 | 5/2005 | Digonnet et al. |
| 6,894,787 B2 | 5/2005 | Youngner et al. |
| 6,898,339 B2 | 5/2005 | Shah et al. |
| 6,900,896 B2 | 5/2005 | Motamedi et al. |
| 6,901,088 B2 | 5/2005 | Li et al. |
| 6,901,176 B2 | 5/2005 | Balachandran et al. |
| 6,904,070 B2 | 6/2005 | Pontis et al. |
| 6,909,548 B2 | 6/2005 | Duggan |
| 6,915,048 B2 | 7/2005 | Kersey et al. |
| 6,917,736 B1 | 7/2005 | Ersoy |
| 6,925,213 B2 | 8/2005 | Boyd et al. |
| 6,940,588 B2 | 9/2005 | Woodside et al. |
| 6,947,218 B2 | 9/2005 | Turner, III |
| 6,955,085 B2 | 10/2005 | Jones et al. |
| 6,963,404 B2 | 11/2005 | Chang |
| 6,985,235 B2 | 1/2006 | Bao et al. |
| 6,989,906 B2 | 1/2006 | Sandercock |
| 7,002,697 B2 | 2/2006 | Domash et al. |
| 7,009,691 B2 | 3/2006 | VanWiggeren et al. |
| 7,016,047 B2 | 3/2006 | May |
| 7,019,837 B2 | 3/2006 | Waagaard |
| 7,043,102 B2 | 5/2006 | Okamoto et al. |
| 7,046,349 B2 | 5/2006 | Everall et al. |
| 7,047,816 B2 | 5/2006 | Jones et al. |
| 7,065,108 B2 | 6/2006 | Park et al. |
| 7,134,346 B2 | 11/2006 | Lopushansky et al. |
| 7,139,081 B2 | 11/2006 | DeGroot |
| 7,139,295 B2 | 11/2006 | Tsai et al. |
| 7,173,713 B2 | 2/2007 | Xu et al. |
| 7,230,959 B2 | 6/2007 | Johnson |
| 7,355,726 B2 | 4/2008 | Jeffers et al. |
| 7,405,829 B2 | 7/2008 | Shen |
| 7,434,472 B2 | 10/2008 | Leitko et al. |
| 2001/0013934 A1 | 8/2001 | Varnham et al. |
| 2002/0015155 A1 | 2/2002 | Pechstedt et al. |
| 2002/0041722 A1 | 4/2002 | Johnson et al. |
| 2002/0109081 A1 | 8/2002 | Tarvin et al. |
| 2002/0167730 A1 | 11/2002 | Needman et al. |
| 2002/0186377 A1 | 12/2002 | Kuskovsky et al. |
| 2003/0020926 A1 | 1/2003 | Miron |
| 2003/0025912 A1 | 2/2003 | Hui et al. |
| 2003/0081875 A1 | 5/2003 | Kochergin et al. |
| 2003/0128917 A1 | 7/2003 | Turpin et al. |
| 2003/0132375 A1 | 7/2003 | Blazo |
| 2003/0141440 A1 | 7/2003 | Kim et al. |
| 2003/0184867 A1 | 10/2003 | Clark |
| 2004/0008742 A1 | 1/2004 | Chou et al. |
| 2004/0013040 A1 | 1/2004 | Maas et al. |
| 2004/0013356 A1 | 1/2004 | Wang et al. |
| 2004/0113104 A1 | 6/2004 | Maida, Jr. |
| 2004/0141184 A1 | 7/2004 | Ueki |
| 2004/0151216 A1 | 8/2004 | Tsai et al. |
| 2004/0151438 A1 | 8/2004 | Ferguson |
| 2004/0196874 A1 | 10/2004 | Spiegelberg et al. |
| 2004/0202399 A1 | 10/2004 | Kochergin et al. |
| 2005/0046859 A1 | 3/2005 | Waagaard |
| 2005/0046862 A1 | 3/2005 | Melnyk |
| 2005/0073690 A1 | 4/2005 | Abbink et al. |
| 2005/0105098 A1 | 5/2005 | Johansen et al. |
| 2005/0213870 A1 | 9/2005 | Kersey et al. |
| 2005/0218299 A1 | 10/2005 | Olsen et al. |
| 2005/0231729 A1 | 10/2005 | Lopushansky et al. |
| 2005/0231730 A1 | 10/2005 | Jeffers et al. |
| 2005/0237538 A1 | 10/2005 | Belleville |
| 2005/0244096 A1 | 11/2005 | Jeffers et al. |
| 2006/0034569 A1 | 2/2006 | Shih et al. |
| 2006/0139652 A1 | 6/2006 | Berthold |
| 2006/0146337 A1 | 7/2006 | Hartog |
| 2006/0152733 A1 | 7/2006 | Waagaard |
| 2006/0241889 A1 | 10/2006 | Lopushansky et al. |
| 2006/0274323 A1 | 12/2006 | Gibler et al. |
| 2007/0006663 A1 | 1/2007 | Zerwekh et al. |
| 2007/0064241 A1 | 3/2007 | Needham |
| 2007/0227252 A1 | 10/2007 | Leitko et al. |
| 2007/0252998 A1 | 11/2007 | Berthold et al. |
| 2008/0043245 A1 | 2/2008 | Needham |
| 2008/0174781 A1 | 7/2008 | Berthold et al. |
| 2008/0186506 A1 | 8/2008 | Lopushansky |
| 2009/0056447 A1 | 3/2009 | Berthold et al. |

FOREIGN PATENT DOCUMENTS

| | | |
|---|---|---|
| DE | 3411096 | 6/1983 |
| EP | 0397388 | 11/1990 |
| EP | 0400939 | 12/1990 |
| EP | 0452993 | 10/1991 |
| EP | 0549166 | 6/1993 |
| EP | 0571107 | 11/1993 |
| EP | 0597345 | 11/1999 |
| EP | 1 586 854 A2 | 10/2005 |
| EP | 1586854 | 10/2005 |
| GB | 1168971 | 10/1969 |
| WO | WO 2004/023071 | 3/2004 |

OTHER PUBLICATIONS

Written Opinion, Nov. 19, 2007, Davidson Instruments.
R. L. Johnson, et al. "Miniature Instrument for the Measurement of Gap Thickness Using Plychromatic Interferometry", Center for Astronomical Adaptive Optics, Steward Obser., U of AZ, Tucson.
MacDougall, Trevor W. and Sanders, Paul E., "Large Diameter Waveguide Bragg Grating Components and Their Application in Downhill Oil & Gas", Wetherford International, Wallingford, CT.
Wavelength Multiplexing of Micromechanical System Pressure and Temperature Sensors Using Fiber Bragg Gratings and Arrayed Waveguide Gratings, Li et al, Optical Engineering Feb. 2003, p. 431-438.
Optical Fiber Sensor Technology, Grattan and Meggit, 2000, pp. 312-313.
Fiber Optic Sensors, Udd, 1991, p. 147.
IEEE Micro Electro Mechanical Systems Conference, Feb. 7, 1993, Ft. Lauderdale, FL; pp. 230-235; K. Aratani et al., "Process and design considerations for surface icromachined beams for a tuneable interferometer array in silicon".
Journal of Vacuum Science and Technology: Part A., vol. 8, No. 4; Jul. 1990; New York, US; pp. 3606-3613; D. W. Burns et al., "Thin films for micromechanical sensors".
Optical Engineering, vol. 31, No. 8; Aug. 1992; Bellingham US; pp. 1638-1642; D. Angelidis et al., "Optical micromachined pressure sensor for aerospace application".
Sensors and Actuators, vol. 20, No. 102; Nov. 15, 1989; Lausanne, CH; pp. 143-151; M. W. Putty et al, "Process integration for active polysilican resonant microstructures".
Sensors and Actuators, A., vol. A21-A23, No. 1-3; Feb. 1990; Lausanne, CH; pp. 387-390; R. M. Pitcher et al., "Optothermal drive of silicon resonators: the influence of surface coatings".
Electronics Letters, vol. 22, No. 21; Oct. 9, 1986; Stevenage, GB; pp. 1097-1099; M. V. Andres et al., "Optical activation of a silicon vibrating sensor".
IEE Proceedings D. Control Theory & Applications, vol. 135, No. 5; Sep. 1988; Stevenage, GB; pp. 364-368; M. J. Tudor et al., "Silicon resonator sensors: interrogation techniques and characteristics".

* cited by examiner

TRACKING ALGORITHM FOR LINEAR ARRAY SIGNAL PROCESSOR FOR FABRY-PEROT CROSS-CORRELATION PATTERN AND METHOD OF USING SAME

CROSS-REFERENCE TO RELATED APPLICATION

This application claims priority from U.S. Provisional Patent Application No. 60/716,483 filed on Sep. 13, 2005, which is hereby incorporated by reference.

FIELD OF THE INVENTION

The present invention is generally related to processing signals from sensors, and more particularly, to enhanced signal processing with a tracking algorithm used with a linear array signal processor and a method for using the same to determine the gap of a Fabry-Perot fiber optic sensor.

BACKGROUND OF THE INVENTION

The invention relates to a method for enhanced processing of signals received from Fabry-Perot sensors. Fabry-Perot sensors have broad utility for applications which require monitoring of absolute, static displacements and small, dynamic vibrations or oscillating changes. For example, their simplicity of design allows these sensors to be embedded into industrial applications, including gas turbines, engines, pressure vessels, pipelines, buildings or other structures, in order to provide information about pressure, temperature, strain, vibration, or acceleration within the structure. Their size, durability, and fast response time make these sensors advantageous. Examples of such sensors or arrangements incorporating such sensors have been developed by the inventor and/or assignee of this application include copending U.S. patent application Ser. No. 11/048,521, which published as U.S. Patent Publication 2005/0244096; Ser. No. 11/105,651, which published as U.S. Patent Publication 2005/0231729; and Ser. No. 11/106,750, which published as U.S. Patent Publication 2005/0231730, each expressly incorporated by reference herein.

A Fabry-Perot fiber optic sensor, shown in FIG. 1, is generally known in the art. A fiber optic Fabry-Perot sensor is an interferometric sensor. Light passes through optical fiber 10. The fiber 10 terminates at partially reflective surface 12a, which is itself aligned with partially reflective surface 12b. Surfaces 12a and 12b are separated by an air gap G which changes due to vibrations or other movement of at least one of the surfaces 12a, 12b. Preferably, surface 12a is fixed while surface 12b is affixed to the object being monitored and may therefore move so as to change the length of the gap G. For example, surface 12b may be affixed to diaphragms, other fibers, cantilever beams or other such structures in order to monitor the aforementioned parameters.

In operation, light travels through fiber 10 and some of this light is reflected back into fiber 10 by surface 12a. Additional light is also reflected back into fiber 10 when it strikes surface 12b. The light reflected from the two surfaces (i.e., that which is transmitted back into fiber 10 via surfaces 12a and 12b) interferes to create an interference pattern, also called a modulation pattern. When the interference pattern is monitored over time for changes, these changes are indicative of changes in the length of the gap G and very small changes or oscillations may be detected with this type of sensor.

Such Fabry-Perot sensors must be used in conjunction with detection and processing equipment in order to provide quantitative feedback concerning changes in gap G over a given period of time. Notably, these arrangements provide for absolute or static measurements as well as relative or dynamic measurements of the oscillations or vibrations caused by changes in the length of the gap G.

In the linear array signal processor (LASP), a cross-correlation pattern is produced when a wedge or Fizeau interferometer is placed in series with a Fabry-Perot sensor (interferometer). The correlation pattern is read out by a linear array of photodetector elements also referred to as pixels. The light source is, for example, a "white light" lamp with a wide output spectrum and the linear array of photodetector elements is, for example, a charge-coupled-device (CCD) made from silicon or InGaAs. Typically, optical fiber runs from the Fabry-Perot sensor to the signal conditioner which is connected to the interferometric correlation element. U.S. Pat. Nos. 5,202,939 and 5,392,117 issued to Bellville et. al. provide a description of a wedge and CCD device and are each also expressly incorporated by reference herein An optical cross-correlation pattern (burst) is shown in FIG. 2. The pattern displays the correlation signal as a function of sensor gap. A common simplistic algorithm in the prior art looks for a feature in the burst such as the feature representing "the largest magnitude peak" or "the largest magnitude valley", and uses this feature to determine the interferometric gap that the feature represents. This simplistic algorithm is not robust enough to be used when the Fabry-Perot gap and the wedge interferometer gap are made of different materials, e.g. air in the Fabry-Perot and transparent oxide in the wedge interferometer. The differences in the refractive index of the gap materials cause the shape of the burst to evolve as the gap in the Fabry-Perot interferometer changes as shown in FIG. 3, Graphs 1-9. This evolution in the shape of the burst can lead to serious errors in the accuracy of the measurement of the gap unless a more sophisticated signal-processing algorithm is used.

Other algorithms use a statistical method called "statistical correlation" to analyze the entire correlation burst and compare it to reference bursts. Such methods work to reduce noise but in the case of the evolving burst waveform, many reference burst signals are needed to provide reliable gap measurements. A description of one such algorithm is defined in US Patent Publication 2005/0073690 herein incorporated by reference.

Another simplistic algorithm analyzes the entire burst and computes an effective center-of-mass of the entire waveform. This method is not subject to discontinuous jumps but limits the dynamic range of the system and has poor resolution compared to the present invention.

SUMMARY OF THE INVENTION

These and other disadvantages are addressed by the invention disclosed herein. An apparatus and method are provided that more accurately identifies a feature in a burst waveform and tracks that feature across the entire range of gaps with no discontinuous jumps and with predictable repeatability.

As such, a method for calculating an interferometric gap is disclosed that comprises providing a first interferometric sensor having an air gap in series with a second interferometer, such as a Fizeau wedge, which has a gap made of a transparent oxide where the gap continuously changes along the wedge direction. The purpose for the Fizeau wedge is to provide an absolute readout of the interferometric sensor gap. Based upon the cross-correlation of the first and second interferometers, a correlation burst waveform is generated having a plurality of features including peaks and valleys. The pattern or shape of the peaks and valleys is a direct function of the dispersion (change in refractive index with light wavelength) of the oxide material in the Fizeau gap. Since there is no dispersion in the Fabry-Perot sensor air gap, there is a relative phase difference between the sensor gap and Fizeau gap, and this phase difference is not a constant for any gap. The phase difference increases with the thickness of the Fizeau gap because of there is no dispersion in the Fabry-Perot sensor air gap. The result is that the shape of the burst waveform evolves across the range of possible Fizeau wedge and Fabry-Perot sensor gaps. In this invention, a means is disclosed for identifying a unique feature (peak or valley) from the pattern of peaks and valleys, and tracking that feature across the entire range of sensor gaps. The dominant peak or dominant valley is used to identify which unique feature to track. The location of this feature with photodetector pixel position on the linear CCD array is used to compute the gap of the Fabry-Perot sensor.

The invention is particularly suited for calculating the interferometric gap produced from the cross-correlation of a Fabry-Perot interferometric sensor having an air gap placed in series with a wedge or Fizeau interferometric wedge having an oxide material in the gap. Further, a particular algorithm is provided that accurately identifies and tracks the waveform features across an entire range of the air gaps and determines the dominant peak or dominant valley used to determine the air gap that the dominant peak or dominant valley represents.

DESCRIPTION OF THE DRAWINGS

Operation of the invention may be better understood by reference to the following detailed description taken in connection with the following illustrations, wherein.

DETAILED DESCRIPTION

The algorithm and method used for analyzing a correlation burst waveform generated by the cross-correlation of two interferometers is hereinafter disclosed. This application relies on an apparatus such as the ones disclosed in U.S. Pat. Nos. 5,202,939 and 5,392,117, which are hereby expressly incorporated by reference. These sensors measure the gap of a Fabry-Perot sensor using two interferometers in series.

The present invention describes a new algorithm that uses the correlation burst generated by such apparati. In particular, the invention analyzes the correlation burst to calculate the gap more precisely over a greater range of gaps than is possible with the existing simplistic algorithm. The new process applies to any apparatus that uses optical cross correlation to determine the gap in a Fabry-Perot interferometric sensor including systems that make absolute and dynamic measurements of the gap.

Figure 1:
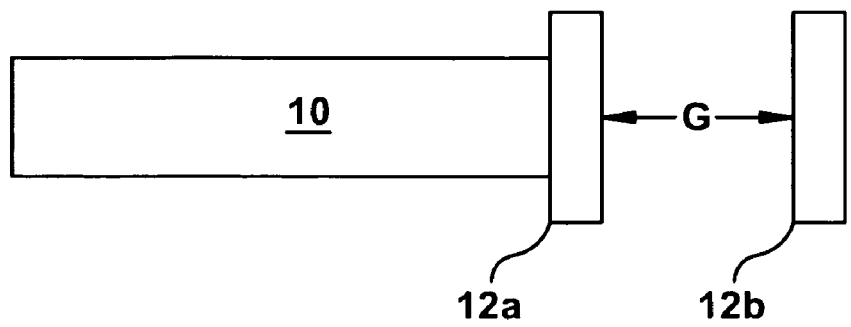
FIG. 1 is a diagram of a Fabry-Perot fiber optic sensor.
Figure 2:
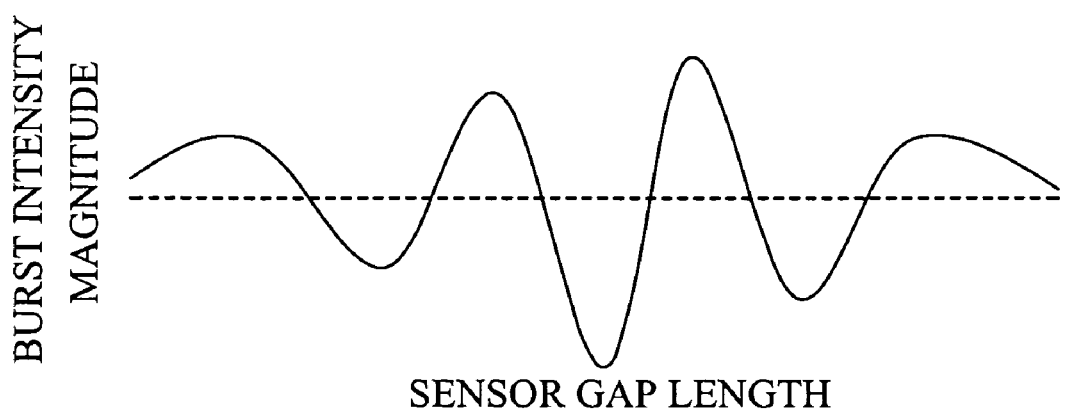
FIG. 2 is a correlation burst waveform.
Figure 3:
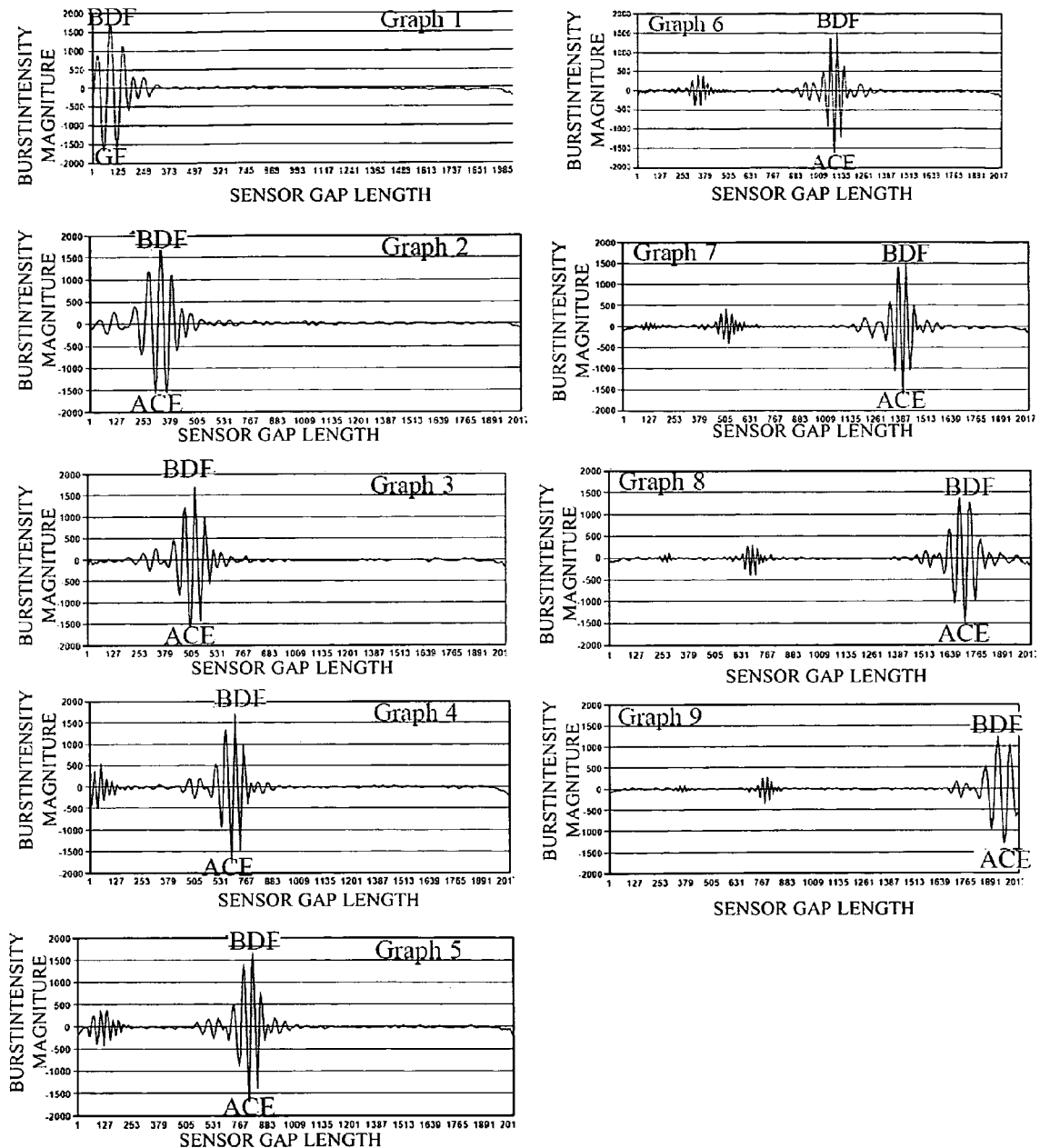
FIG. 3 shows the modulation of correlation burst.
Figure 6:
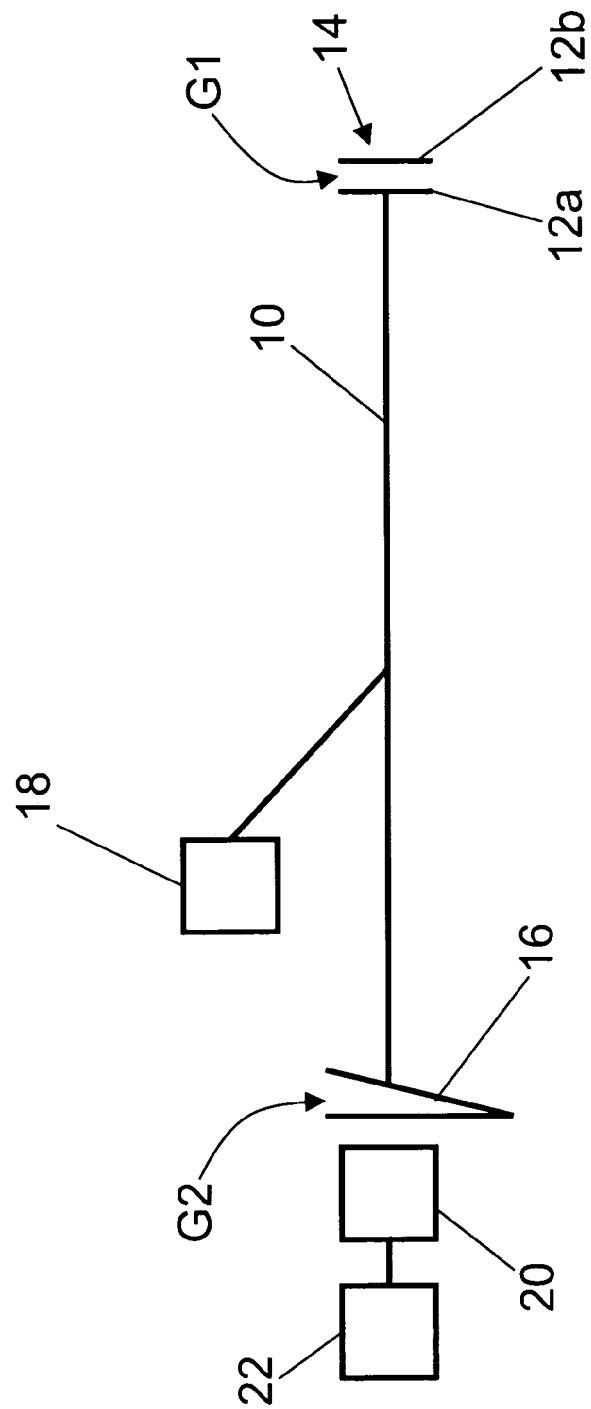
FIG. 6 is a diagram of a Fabry-Perot interferometer sensor in series with a second interferometer.

The optical cross-correlation pattern or burst as shown in FIG. 2 has a number of features that characterize the burst. As seen in FIG. 6, when a Fabry-Perot interferometric sensor 14 with an air gap G1 is placed in series with a second interferometer 16 such as a Fizeau wedge which has a gap G2 that is made of a transparent oxide material, the shape of the burst evolves as the gap G1 in the Fabry-Perot interferometer 14 changes as shown in FIG. 3, graphs 1-9. The cross-correlation pattern is detected by a detector 20 such as a charged coupled device (CCD).

The cross-correlation pattern is then received by a device 22 such as a signal conditioner and analyzed by software. The feature that has the largest magnitude at small gaps does not have the largest magnitude at large gaps. The extent of the evolution of the shape of the burst is a function of the bandwidth of the light source 18 and the variability in the refractive indices of the gap media in the Fizeau wedge 16 over the range of wavelengths used by the system. Note that unlike air, which has uniform refractive index over the range of wavelengths, the transparent oxide material that defines the Fizeau wedge gap G2 does not have a constant refractive index over the range of wavelengths, and this defines the dispersive properties of the oxide material. It should be noted that the preferred embodiment of the invention is described herein with reference to a Fabry-Perot interferometric sensor having an air (non-dispersive) gap placed in series with a Fizeau wedge having a transparent oxide material (dispersive) gap. However, it should be clear that numerous other materials could be used in the sensor or correlator gaps. However, it is contemplated that while the sensor gap can include a dispersive or non-dispersive material, the correlation gap preferably will have a dispersive material.

Note in FIG. 3 that at small gaps (Graph 1) feature (D) has the largest magnitude or is dominant while at large gaps (Graph 7) feature (C) is dominant. Simplistic algorithms that use the dominant feature fail to track the gap across its full range of motion because they eventually skip to an adjacent feature when the adjacent feature becomes dominant. For example, an algorithm seeking the largest magnitude peak (D) (Graph 1) will be confused when feature (D) modulates to a reduced magnitude and feature (B) modulates to a larger magnitude (Graphs 5-8). The spacing between adjacent features (A, C, E) or (B, D, F) is approximately lambda/2 where lambda is the center wavelength of the light source. When an adjacent feature becomes dominant, the simplistic algorithm may skip from feature D to feature B or even feature F. The error associated with skipping features is therefore in the range of lambda/2. In a system where lambda is 850 nm, this skip represents an error of 425 nm. An error of 425 nm in a system with a total range of 15,000 nm represents an error in excess of 2% which is unacceptable for most measurement applications.

Instead of using the dominant feature to determine the gap, the algorithm described herein identifies a feature in the burst and tracks this feature across the entire range of gaps with no discontinuous jumps and with predictable repeatability. The process selects and tracks this feature by knowing the relationships between the features at various gaps. Therefore, the algorithm can track a feature even though it is not always the largest or the most dominant feature and uses many features of the waveform to select the specific feature to be tracked.

Notice in FIG. 3, graphs 1-9 that for short gaps (graph 1-3) feature D is dominant and for large gaps (graphs 7-9) feature C is dominant. At points in between (graphs 4-6) neither feature C nor D is clearly dominant. Notice also that as the signal evolves there is only one transition from a dominant D to a dominant C and that these two dominant features are always adjacent to one another.

Using this knowledge of how the signal evolves, feature C can be selected and tracked. Feature C can always be identified as the feature which is the dominant or the feature adjacent to the dominant feature.

Figure 4:
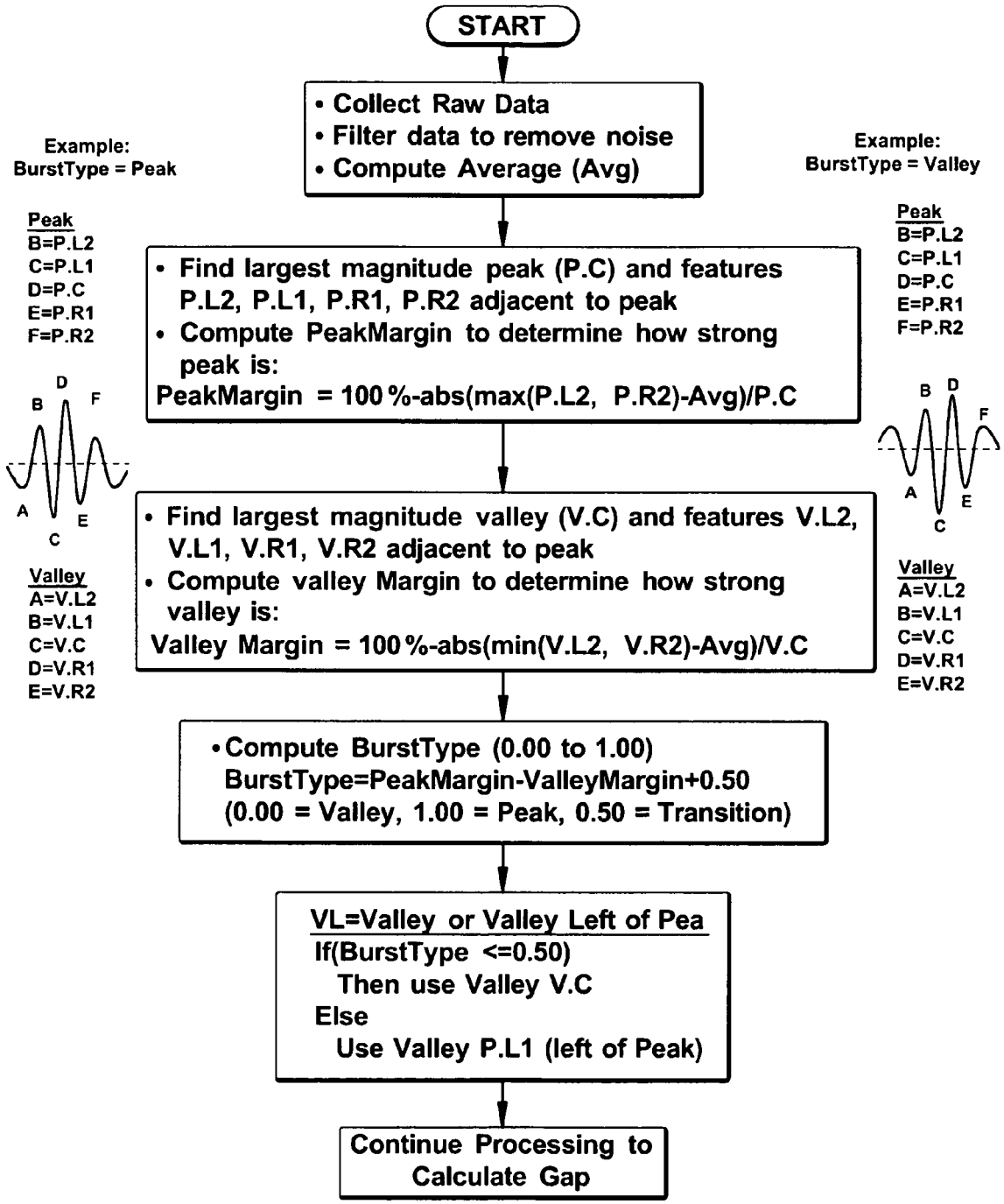
FIG. 4 is a flow chart showing the transition strategy for an embodiment of the invention.
Figure 5:
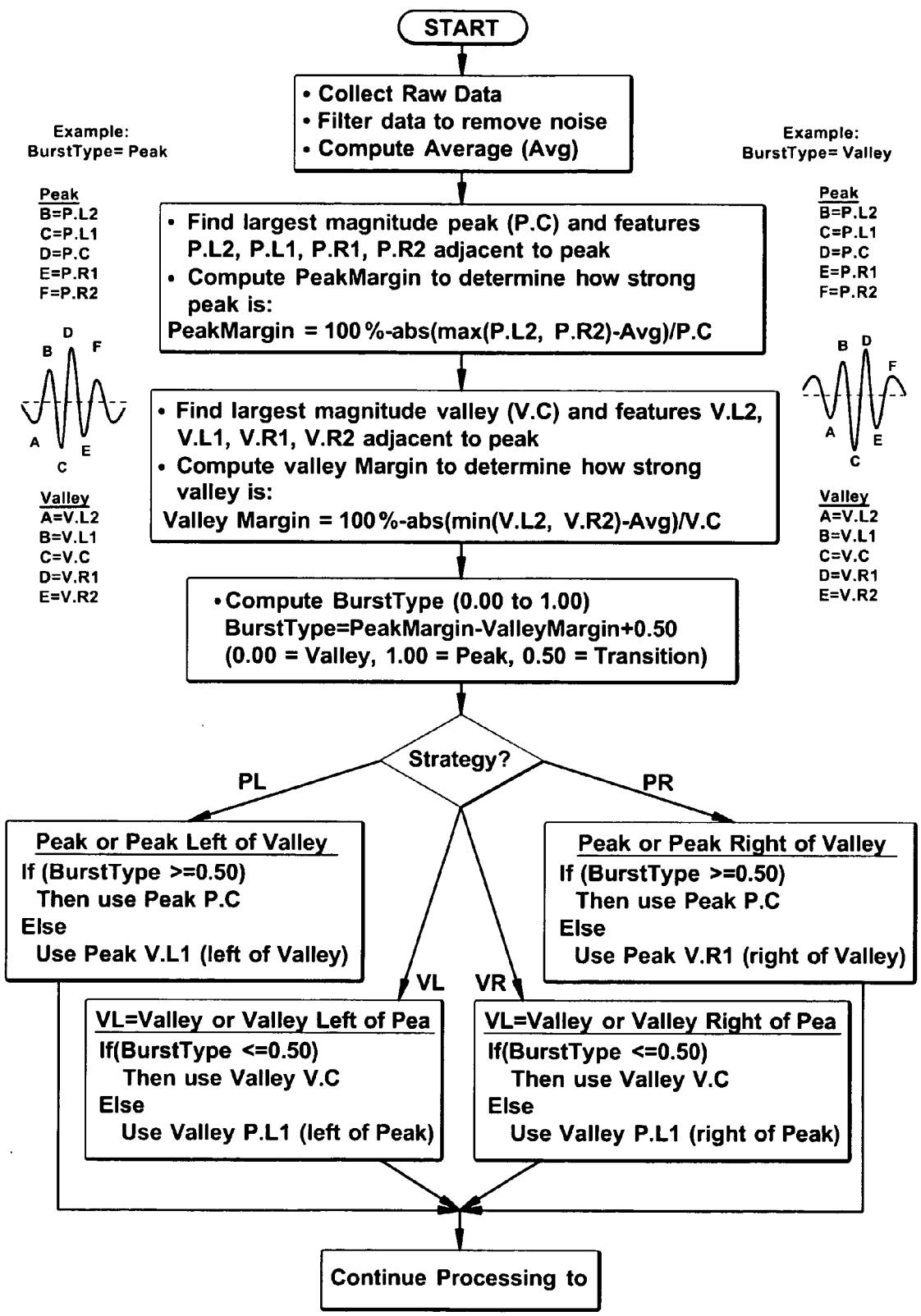
FIG. 5 is a flow chart showing an alternate transition strategy.

How the software characterizes the burst waveform pattern and its features is outlined in the flowchart in FIG. 4 where "Margin", "Valley Margin", and "Peak Margin" are defined. These burst waveform patterns and features are measures of how large a feature (e.g. C) is compared to other features such as V.L2 and V.R2 . And while this software and algorithm are used to calculate the gap of interferometric sensors placed in series, it should be clear that this software and algorithm could be used for tracking and identifying features of any waveform and for any use. The following terminology applies throughout this application:

min(Value1, Value2) is the mathematic function "minimum of Value1 or Value2"

max(Value1, Value2) is the mathematic function "maximum of Value1 or Value2"

abs(Value1) is the mathematic function "Absolute value of Value1"

Avg is the average intensity through the centerline of the burst waveform measured in the Y-Axis. Typically Avg is zero.

Peak Margin:
Compute ratio of the second largest magnitude peak to the largest magnitude peak and subtract from 100%.

$$PeakMargin = 100\% - abs(max(P.L2, P.R2) - Avg)/C$$

Valley Margin:
Compute the ratio of the second largest magnitude valley to the largest magnitude valley and subtract from 100%.

$$Valley\ Margin = 100\% - abs(min(V.L2, V.R2) - Avg)/C$$

"BurstType" is defined as BurstType=Peak Margin−Valley Margin+0.5 with values that lie between 0 and 1. When the BurstType is close to zero, it is an indication of a dominant valley. When the BurstType is close to one, it is an indication of a dominant peak. When BurstType is close to 0.5, it is an indication that the burst is near a transition point.

Analysis of the margin data shows the following general characteristics:

In FIG. 4 example BurstType=Peak, a clearly dominant feature Peak D has approximately 30% margin over features B and F and B and F have margins approaching 0%, i.e. they are about equal.

In FIG. 4 example BurstType=Valley, a clearly dominant feature Valley C has approximately 30% margin over features A and E and A and E have margins approaching 0%, i.e. they are about equal.

At the transition point, the most dominant peak and dominant valley margins are each approximately 10%.

The preferred strategy for selecting and tracking a feature in the burst waveform through the entire range of gaps is defined as the "Automatic Tracking Algorithm" and is also outlined in the flow chart in FIG. 4. FIG. 4 represents an implementation of method "VL" as defined in Table 1 below. Although the description of the algorithm is limited to a condition with a single transition, it may be easily adapted for tracking burst waveforms with multiple transitions.

Steps:
1. Capture the burst waveform
2. Identify the features that are the maxima (dominant peak) and minima (dominant valley) in the waveform.
3. Compute BurstType, Peak Margin, and Valley Margin
4. Determine which feature is to be used to track the burst based on the selection criteria defined in the flowchart in FIG. 4.
5. Use the pixel location of the feature being tracked to compute the gap.

Note that near transition points it is very likely that the same feature will be selected regardless of whether the BurstType is a peak, valley, or is indeterminate. Thus this algorithm is especially robust near transition points. This is a sharp contrast to simplistic algorithms which are weakest at transition points. For example, refer to FIG. 3 Graph 4. Assume strategy "VL" (Valley or Valley Left of dominant Peak) is used, point D is the peak and point C is the valley. Since Valley C is already "left of" Peak D, Valley C will always be chosen. That is, if the calculated valued of BurstType is less than or equal to 0.50, then use Valley C and if the calculated BurstType is greater than 0.50, then use the valley left of the peak which is still Valley C.

In the preferred embodiment of the present invention, this new algorithm identifies a feature in the burst waveform and tracks this feature across the entire range of gaps with no discontinuous jumps and with predictable repeatability. The invention selects and tracks this feature by knowing the relationships between the features at various gaps. Notably, the invention is able to track a feature even though it is not always the largest nor the most dominant feature, and many features of the waveform are used to select the feature to be tracked.

Alternatively as described in Table 1, multiple features in the burst waveform may be tracked across the entire gap range resulting in smooth tracking through the entire range of gaps with no discontinuous jumps and with predictable repeatability. The selection of these features is based the location of the approximate gap and the characteristics of those features adjacent to those which are most dominant. These methods solve the problems associated with errors introduced by evolving burst waveforms Although the prior description defines the case where the burst waveform evolves from one dominant feature to an adjacent dominant feature, the general form of this algorithm can be used even if the waveform has a consistent dominant feature or evolves to more than two dominant features. For a variety of other reasons, it may be necessary to consider other variations of the preferred tracking strategy using lookup tables and similar techniques to determine which feature to select and track without departing from the principles of the invention contemplated herein. For example, one may determine that a burst waveform may have one or more dominant peaks and valleys as it moves through its full range. By knowing the gap location of the transition points, one may create a lookup table and use the lookup table to select the method and this method is used to select the feature to be tracked. The method is used until the waveform moves into a new transition region.

The preferred embodiment of this invention discussed above encompasses sensors with an optical gap from approximately 5,000 nm to 20,000 nm. An air-gap sensor with this operating range cross-correlated with an oxide-based Fizeau wedge produces the modulation progression seen in FIG. 3, Charts 1-9. Examination of this progression shows that at low gaps, strategy VLP (Valley Left Of Peak) consistently selects valley "C" and at high gaps, strategy VO (Valley Only) consistently selects the same valley "C". A single transition between strategies occurs at approximately 14,000 nm.

A sensor with an oxide-based Fizeau wedge cross-correlated with another oxide-based Fizeau wedge does not evolve as in FIG. 3 and strategy VO (Valley Only) would be appropriate for all gaps. See Table 1.

A sensor with a different range of gaps, different gap media, or different refractive index could progress in a different manner and the other strategies in Table 1 could be appropriate for these cases. Each sensor could be calibrated with a simple lookup table indicating which strategy to use for a given gap. Any combination of strategies may be used. As a part of the set-up and calibration procedure during manufacturing, the appropriate strategy would be selected for use with a specific sensor for a specific application.

For example, using this concept, one variation of this algorithm would work as follows:

If $G_{MIN} <= G_{APPROXIMATE} < G_{TRANSITION\_1}$ then use Method_8 (VLP)

If $G_{TRANSITION\_1} <= G_{APPROXIMATE} < G_{TRANSITION\_2}$ then use Method_1 (VO)

If $G_{TRANSITION\_2} <= G_{APPROXIMATE} <= G_{MAX}$ then use Method_9 (VRP)

Where $G_{MIN}$ and $G_{MAX}$ define the range of usable gaps $G_{APPROXIMATE}$ is the approximate gap of the waveform $G_{TRANSITION\_x}$ are transition points defined in a lookup table Methods are defined in Table 1 (Note other methods are possible (ex. VLV, VRV, PLP, PRP, as are combinations of these methods).

TABLE 1

Methods to select which feature to track

| Method | Abbrev | Description |
| --- | --- | --- |
| 1 | VO | Use Largest MagnitudeValley Only |
| 2 | PO | Use Largest Peak Only |
| 3 | PV | Use Peak OR Valley - whichever has largest magnitude |
| 4 | VL | Use Valley or Valley-Left-of-Largest Peak |
| 5 | VR | Use Valley or Valley-Right-of-Largest Peak |
| 6 | PL | Use Peak or Peak-Left-of-Largest Valley |
| 7 | PR | Use Peak or Peak-Right-of-Largest Valley |
| 8 | VLP | Use Valley Left of Largest Peak |
| 9 | VRP | Use Valley Right of Largest Peak |
| 10 | PLV | Use Peak Left of Largest Valley |
| 11 | PRV | Use Peak Right of Largest Valley |

Steps:
1. Capture a burst waveform.
2. Identify the features that are the maxima (dominant peak) and minima (dominant valley in the waveform.
3. Compute an approximate gap ($G_{APPROXIMATE}$) based on the location of the dominant peak and dominant valley.
4. Look up $G_{APPROXIMATE}$ in the lookup table and identify the corresponding method. An example lookup table is shown in Table 2. Sample methods are defined in Table 1.
5. Use the identified method to select the feature in the burst waveform to be tracked.
6. Use the pixel location of the feature being tracked to compute a gap.

TABLE 2

Example of lookup table

| TRANSITION GAP (nm) | METHOD |
| --- | --- |
| 0 | VLP |
| 5000 | VLP |
| 10000 | VO |
| 15000 | VRP |

The invention has been described above according to several embodiments and, obviously, modifications and alterations will occur to others upon a reading and understanding of this specification. The claims as follows are intended to include all embodiments, modifications, and alterations whether fully described herein, incorporated by reference, or understood based upon a reading of the specification insofar as they come within the scope of the appended claims or the equivalents thereof.

Having thus described the invention, I claim:

1. A method for calculating an interferometric gap of an interferometric sensor from a cross-correlation of the interferometeric sensor and an interferometric correlation element, said method comprising:
providing an interferometric sensor having a first gap;
providing an interferometric correlation element having a substantially linear varying second gap, said second gap comprising a dispersive material placed in series with said first gap;
generating a correlation burst waveform having a plurality of features including peaks and valleys from a cross-correlation of said sensor and said correlation element wherein the shape of the burst waveform evolves due to dispersion across the range of the second gap;
collecting data on the correlation burst waveform;
tracking said features across an entire range of the first gap and determining a dominant peak or a dominant valley;
computing a peak margin, where the peak margin is a ratio of a second largest magnitude peak to the dominant peak subtracted from 100 percent; and
using the dominant peak or dominant valley and the computed peak margin to determine a length of the first gap that the dominant peak or dominant valley represents.

2. The method of claim 1 further comprising:
filtering said data to remove noise; and
computing the average intensity of the waveform through the centerline of the waveform measured in the Y-Axis.

3. The method of claim 1 wherein said peak margin is computed by an algorithm, where the algorithm is Peak Margin=100% −abs(max(P.L2, P.R2)−Avg)/P.C, where:
abs is a function that takes the absolute value of a number;
max is a function that chooses the largest value from a set of values;
P.L2 is a magnitude of a peak to the left of the dominant peak in the correlation burst waveform;
P.R2 is a magnitude of a peak to the right of the dominant peak in the correlation burst waveform;
Avg. is the average intensity of the waveform through the centerline of the waveform measured in the Y-Axis; and
P.C. is the magnitude of the dominant peak in the correlation burst waveform.

4. The method of claim 1 further comprising computing a valley margin which is a ratio of the second largest magnitude valley to the dominant valley subtracted from 100%.

5. The method of claim 4 wherein said valley margin is computed by an algorithm, where the algorithm is Valley Margin=100%−abs(max(V.L2, V.R2)−Avg/V.C, where abs is a function that takes the absolute value of a number;
max is a function that chooses the largest value from a set of values;
V.L2 is a magnitude of a valley to the left of the dominant valley in the correlation burst waveform;
V.R2 is a magnitude of a valley to the right of the dominant valley in the correlation burst waveform;
Avg. is the average intensity of the waveform through the centerline of the waveform measured in the Y-Axis; and
V.C. is a magnitude of the dominant valley in the correlation burst waveform.

6. The method of claim 4 further comprising computing a BurstType to identify the dominant peak or dominant valley.

7. The method of claim 6 wherein said BurstType is computed an algorithm, where the algorithm is BurstType=Peak Margin−Valley Margin+0.5 so that when said BurstType is closer to zero, it is an indication of a dominant valley and when said BurstType is closer to one, it is an indication of a dominant peak and when the BurstType is close to 0.5, it is an indication of the nearing of a transition point.

8. The method of claim 7 wherein said first gap is comprised of a dispersive material, a non-dispersive material, or a vacuum.

9. The method of claim 8 wherein said second gap is comprised of a transparent oxide material.

10. The method of claim 9 wherein said correlation element is a wedge and the readout is the wedge attached to a CCD array.

11. A method for calculating a magnitude of an interferometric gap from a cross-correlation of an interferometeric sensor and an interferometric correlation element, said method comprising:
providing a Fabry-Perot interferometric sensor having a first gap;
providing a wedge or Fizeau interferometric correlation element having a second gap comprising a dispersive material, said correlation element placed in series with said Fabry-Perot sensor;
generating a correlation burst waveform having a plurality of features including peaks and valleys from the cross-correlation of said sensor and said correlation element wherein the shape of the burst waveform evolves across the range of first gaps as the first gap changes;
tracking said features across an entire range of first gaps and determining a dominant peak or a dominant valley;
computing a peak margin with a first algorithm, where the first algorithm is Peak Margin=100%−abs(max(P.L2, P.R2)−Avg)/P.C, where:
abs is a function that takes the absolute value of a number;
max is a function that chooses the largest value from a set of values;
P.L2 is a magnitude of a peak to the left of the dominant peak in the correlation burst waveform;
P.R2 is a magnitude of a peak to the right of the dominant peak in the correlation burst waveform;
Avg. is the average intensity of the waveform through the centerline of the correlation burst waveform measured in the Y-Axis; and
P.C. is the magnitude of the dominant peak in the correlation burst waveform; and
using the dominant peak or dominant valley to determine a magnitude of the first gap that the dominant peak or dominant valley represents.

12. The method of claim 11 further comprising:
collecting data on the correlation burst waveform;
computing a valley margin by a second algorithm, where the second algorithm is Valley Margin=100%−abs(max (V.L2, V.R2)−Avg/V.C, where
abs is a function that takes the absolute value of a number;
max is a function that chooses the largest value from a set of values;
V.L2 is a magnitude of a valley to the left of the dominant valley in the correlation burst waveform;
V.R2 is a magnitude of a valley to the right of the dominant valley in the correlation burst waveform;
Avg. is the average intensity of the waveform through the centerline of the waveform measured in the Y-Axis; and
V.C. is a magnitude of the dominant valley in the correlation burst waveform; and
computing a BurstType by a third algorithm, where the third algorithm is BurstType=Peak Margin−Valley Margin+0.5 so that when said BurstType is closer to zero, it is an indication of the dominant valley and when said BurstType is closer to one, it is an indication of a dominant peak and when said BurstType is close to 0.5, it is an indication of the nearing of a transition point.

13. The method of claim 12 wherein said first gap is comprised of a dispersive material, a non-dispersive material, or a vacuum.

14. The method of claim 13 wherein said second gap is comprised of a transparent oxide material.

15. The method of claim 14 wherein said second gap is a substantially linear varying gap having a continuum of gaps including gaps that are greater than, less than, or equal to said first gap.

16. A linear array signal processor (LASP) comprising:
an interferometric sensor having a first gap;
an interferometric correlation element having a second gap comprised of a dispersive material, said correlation element placed in series with said first sensor;
a CCD array attached to said correlation element to read out a correlation pattern;
means for identifying and collecting data on a correlation burst waveform having a plurality of features including peaks and valleys from the cross-correlation of said sensor and said correlation element wherein the shape of the burst waveform evolves across the range of first gaps as the first gap changes;
means for computing a peak margin for the correlation burst waveform, where the peak margin is a ratio of the magnitude of the second largest magnitude peak to magnitude of the dominant peak subtracted from 100%;
means for tracking said features across an entire range of first gaps and determining the dominant peak or dominant valley; and
means for calculating the magnitude of the first gap represented by the dominant peak.

17. The linear array signal processor of claim 16 wherein said means for computing peak margin comprises:
means for filtering said collected data to remove noise; and
means for computing the average intensity of the waveform through the centerline of the waveform measured in the Y-Axis.

18. The linear array signal processor of claim 17 wherein said peak margin is computed by a first algorithm, where the first algorithm is Peak Margin=100%−abs(max(P.L2, P.R2)−Avg)/P.C, where:
abs is a function that takes the absolute value of a number;
max is a function that chooses the largest value from a set of values;
P.L2 is a magnitude of a peak to the left of the dominant peak in the correlation burst waveform;
P.R2 is a magnitude of a peak to the right of the dominant peak in the correlation burst waveform;
Avg. is the average intensity of the waveform through the centerline of the correlation burst waveform measured in the Y-Axis; and
P.C. is the magnitude of the dominant peak in the correlation burst waveform.

19. The linear array signal processor of claim 18 further comprising:
means for computing a valley margin for the correlation burst waveform, which is a ratio of the magnitude of a second largest valley to the dominant valley subtracted from 100%.

20. The linear array signal processor of claim 19 wherein said valley margin is computer by a second algorithm, where the second algorithm is Valley Margin=100%−abs(max (V.L2, V.R2)−Avg/V.C, where
abs is a function that takes the absolute value of a number;

max is a function that chooses the largest value from a set of values;

V.L2 is a magnitude of a valley to the left of the dominant valley in the correlation burst waveform;

V.R2 is a magnitude of a valley to the right of the dominant valley in the correlation burst waveform;

Avg. is the average intensity of the waveform through the centerline of the waveform measured in the Y-Axis; and V.C. is a magnitude of the dominant valley in the correlation burst waveform.

21. The linear array signal processor of claim 20 further comprising:

means for computing a BurstType to identify the dominant peak or dominant valley.

22. The linear array signal processor of claim 21 wherein said BurstType is computed by a third algorithm, where the third algorithm is BurstType=Peak Margin−Valley Margin+ 0.5 so that when said BurstType is closer to zero, it is an indication of a dominant valley and when said BurstType is closer to one, it is an indication of a dominant peak and when the BurstType is close to 0.5, it is an indication of the nearing of a transition point.

23. The linear array signal processor of claim 22 wherein said first gap is comprised of a dispersive material, a non-dispersive material, or a vacuum.

24. The linear array signal processor of claim 23 wherein said second gap is comprised of a transparent oxide material.

* * * * *